US008065181B2

(12) United States Patent
McNew et al.

(10) Patent No.: US 8,065,181 B2
(45) Date of Patent: Nov. 22, 2011

(54) SYSTEM AND METHOD FOR ELECTRONIC TOLL COLLECTION BASED ON VEHICLE LOAD

(75) Inventors: Justin Paul McNew, Del Mar, CA (US); Refi Tugrul Guener, Baden (AT); Markus Russold, Hartberg (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 12/572,849

(22) Filed: Oct. 2, 2009

(65) Prior Publication Data
US 2010/0106567 A1 Apr. 29, 2010

Related U.S. Application Data

(60) Provisional application No. 61/106,098, filed on Oct. 16, 2008.

(51) Int. Cl.
G07B 15/00 (2011.01)
G07B 15/02 (2011.01)
G08G 1/00 (2006.01)
G08G 1/065 (2006.01)
(52) U.S. Cl. ........... 705/13; 340/928; 340/933; 235/384
(58) Field of Classification Search ............... 705/13; 340/928, 572, 942
See application file for complete search history.

(56) References Cited

U.S. PATENT DOCUMENTS

| | | | | |
|---|---|---|---|---|
| 5,289,183 A * | 2/1994 | Hassett et al. | ............ | 340/905 |
| 5,920,057 A * | 7/1999 | Sonderegger et al. | ........ | 235/384 |
| 7,375,648 B1 * | 5/2008 | Mulka et al. | ............ | 340/905 |
| 7,650,227 B2 * | 1/2010 | Kirk et al. | ............ | 701/117 |
| 2002/0000921 A1 * | 1/2002 | Hutchinson | ............ | 340/942 |
| 2002/0072963 A1 * | 6/2002 | Jonge | ............ | 705/13 |
| 2004/0119609 A1 * | 6/2004 | Solomon | ............ | 340/928 |
| 2004/0167861 A1 * | 8/2004 | Hedley | ............ | 705/400 |
| 2004/0206817 A1 * | 10/2004 | Grant | ............ | 235/384 |
| 2004/0212518 A1 * | 10/2004 | Tajima et al. | ............ | 340/928 |
| 2005/0179563 A1 * | 8/2005 | Kelley | ............ | 340/928 |
| 2005/0278214 A1 * | 12/2005 | Takida | ............ | 705/13 |
| 2006/0015394 A1 * | 1/2006 | Sorensen | ............ | 705/13 |
| 2006/0044161 A1 * | 3/2006 | Feldman et al. | ............ | 340/933 |
| 2007/0268140 A1 * | 11/2007 | Tang et al. | ............ | 340/572.4 |
| 2007/0285279 A1 * | 12/2007 | Robinson et al. | ............ | 340/928 |
| 2008/0175438 A1 * | 7/2008 | Alves | ............ | 382/105 |
| 2009/0018902 A1 * | 1/2009 | Miller et al. | ............ | 705/13 |
| 2010/0085213 A1 * | 4/2010 | Turnock et al. | ............ | 340/928 |
| 2010/0201505 A1 * | 8/2010 | Honary et al. | ............ | 340/425.5 |

\* cited by examiner

*Primary Examiner* — John Hayes
*Assistant Examiner* — Brian Epstein
(74) *Attorney, Agent, or Firm* — Christie, Parker & Hale, LLP.

(57) ABSTRACT

A system for electronic toll collection from a vehicle including an electronic tag for capturing information including a number of passengers in the vehicle and an electronic tag identification, a wireless transmitter for transmitting the captured information; and a wireless receiver for receiving the captured information. The system further includes a toll computer for determining a toll fee for the vehicle based on the received number of passengers and a time of day. The wireless transmitter may be an IR or RF transmitter.

The toll computer determines the toll fee for the vehicle based on the received number of passengers, and one or more of the time of day, the day and the traffic information.

16 Claims, 6 Drawing Sheets

OFF-PEAK PERIOD
| | |
|---|---|
| HOV 1 | $2.50 |
| HOV 2 | $1.50 |
| HOV 3+ | FREE |

FIG. 2A

PEAK PERIOD
| | |
|---|---|
| HOV 1 | No Entry |
| HOV 2 | $3.00 |
| HOV 3 | $2.50 |
| HOV 4+ | $1.00 |

FIG. 2B

SYSTEM AND METHOD FOR ELECTRONIC TOLL COLLECTION BASED ON VEHICLE LOAD

CROSS-REFERENCE TO RELATED APPLICATION

This patent application claims the benefit of the filing date of U.S. Provisional Patent Application Ser. No. 61/106,098, filed Oct. 16, 2008 and entitled "System And Method For Electronic Toll Collection Based On Vehicle Load", the entire content of which is hereby expressly incorporated by reference.

FIELD OF THE INVENTION

This invention relates to the general area of electronic toll collection, and more specifically to a system and method for electronic toll collection based on the number of passengers in the vehicle.

BACKGROUND

A typical Electronic Toll Collection (ETC) system electronically charges motorists a tolling fee for using certain roads or High Occupancy Toll (HOT) lanes, without having them physically stop at a toll booth to pay. The motorist users of these systems generally open a pre-funded account to serve as a source of funds to pay for charges made with some type of an electronic tag associated with the pre-funded account. These pre-funded accounts are typically maintained by the ETC system operator.

ETC systems typically detect some tag identification associated with the tag using some type of sensor as the motorist passes through an ETC equipped toll booth. Tag identification information may be contained for example in bar coded labels, which are placed on the vehicle and detected by sensors, e.g., laser scanners, at the toll gantry. Often the tags are intended to be attached to the motorist's front windshield or side window by some type of adhesive, and, for the most part, are contained in generic plastic casings.

HOT lanes reduce vehicle hours traveled thereby reducing overall traffic volume and increasing average traffic speed for HOT lane users. They provide an additional source of revenue for state Department of Transportations or private toll authorities, who can use the revenue to support transportation improvements. HOT lanes also provide an opportunity to improve the efficiency of existing or newly built High Occupancy Vehicle (HOV) lanes (e.g., Car Pool lanes) by utilizing excess capacity and improving throughput.

However, existing ETC systems and HOT lane solutions do not provide a complete end-to-end solution that is low cost. Furthermore, existing ETC systems do not take into account the load (number of passengers) of the vehicle. This limits the toll agency's ability to price discriminate on a more granular level for congestion pricing. Therefore, there is a need for an improved, low cost ETC system that improves traffic flow, increases the toll revenue, and simplifies the management of toll collection and distribution.

SUMMARY

In some embodiments, the present invention is a method for electronic toll collection from a vehicle. The method includes: electronically receiving a number of passengers in the vehicle by an electronic tag; wirelessly receiving the number of passengers and an electronic tag identification, from the electronic tag, at a toll center; and determining a toll fee for the vehicle based on the received number of passengers and a time of day. Additionally, traffic information for an area around the toll center may be electronically received and the toll fee for the vehicle determined based on the received number of passengers, the time of day, and the traffic information. The traffic information may be the number of vehicles in a time period traveling in a high occupancy toll lane, in which the vehicle is traveling.

In some embodiments, the present invention is a system for electronic toll collection from a vehicle. The system includes an electronic tag for capturing information including a number of passengers in the vehicle and an electronic tag identification, a wireless transmitter for transmitting the captured information; and a wireless receiver for receiving the captured information. The system further includes a toll computer for determining a toll fee for the vehicle based on the received number of passengers and a time of day. The wireless transmitter may be an IR or RF transmitter.

The toll computer determines the toll fee for the vehicle based on the received number of passengers, and one or more of the time of day, the day and the traffic information. The traffic information may be collected from the electronic toll collection system.

BRIEF DESCRIPTION OF THE DRAWINGS

FIGS. 2A and 2B depict exemplary toll fees based on a vehicle load and time of the day, according to some embodiments of the present invention.

DETAILED DESCRIPTION

The present invention is a system and method for ETC that takes into account the vehicle load and offers toll system operators unique flexibility in their tolling fee structures that help maintain free flow conditions and ideal traffic profiles.

Figure 1:
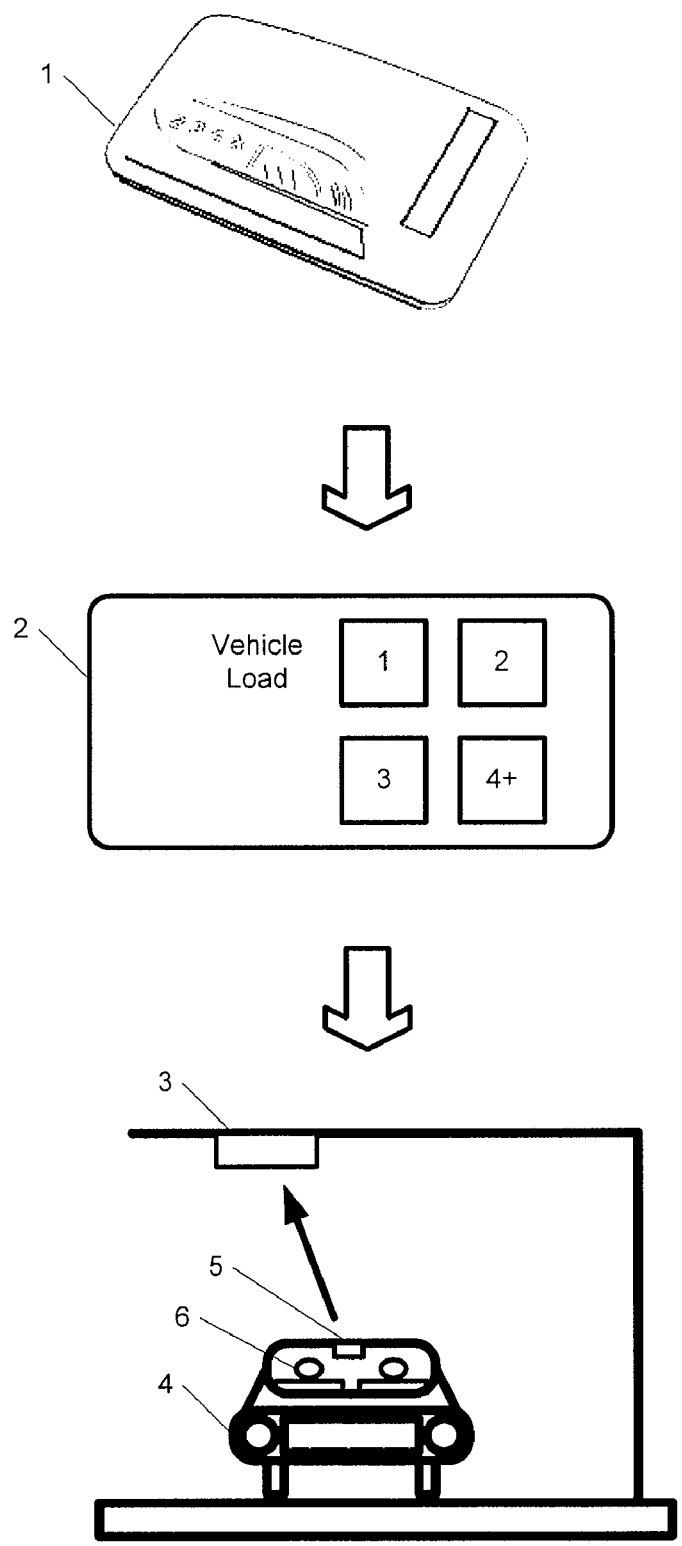
FIG. 1 is an exemplary electronic tag, according to some embodiments of the present invention.

FIG. 1 is an exemplary electronic tag, according to some embodiments of the present invention. In some embodiments, the electronic tag allows a motorist to declare the number of passengers in the vehicle through a simple button press, which may be electromechanical or in more sophisticated embodiments, may include a graphical user interface such as a touch screen. Some embodiments may also include an interface between the electronic tag and sensors in the vehicle that can automatically detect the presence and number of passengers. The passenger load data is stored in the tag's configurable memory that can be read out over a wireless network by both road side and enforcement equipment. The declared vehicle passenger load allows the tolling system to charge a variable fee based on vehicle load in addition to some other measures such as, time of the day, day of the week/year (for example, a Monday or Labor Day), location of the tolling point, traffic conditions, etc.

Upon passing a gantry, the declared vehicle load is read by the toll system, a tolling transaction is generated and a fee based on vehicle load and/or time of day is charged by the system. A pre-funded account or a credit account may then be charged for the fee amount. The tag identification information and the declared vehicle load information may be transmitted wirelessly (e.g., RF, IR), where the emitted signal is read by a reader/antenna located at the road side or the toll booth.

FIGS. 2A and 2B depict exemplary toll fees based on a vehicle load and time of the day, according to some embodiments of the present invention. The toll fee may also vary depending on other variables, including the traffic speed in some or all traffic lanes, the time of the day, the day of the week/year, the vehicle class, and the tolling point location. For example, as shown in FIG. 2A, during off-peak hours, the fee may be $2.50 no passenger (driver only), $1.50 for one passenger (total of two people), and free if the vehicle carries three or more people. However, the fee structure can change (increase) during peak operating hours. For example, a car with no passenger will not be allowed to use the HOT lane during the peak hours, and is charged $3.00 if it carries one passenger, $2.50 for two passengers and $1.00 for more than three passengers, as shown in FIG. 2B.

Furthermore, the toll may vary based on traffic congestion on a HOT lane. For example, the toll may vary depending on how many vehicles may pass a certain point in the HOT lane per a number of minutes or any other unit of time. In some embodiments the vehicles may be counted by counting the number of tags passing a certain point, or by video cameras that detect the vehicles passing at a certain point, or by other electronic sensors. Moreover, the toll may vary based on the type or class of the vehicle. For example, a bus or commercial truck may have to pay more (or less) than a sedan, a taxi may have to pay differently than a privately owned car, or a government vehicle may be exempt from paying.

The load discriminated value pricing structures give greater flexibility in implementing tolling schemes that help maintain free flow conditions or improved congestions in HOT lanes.

Figure 3:
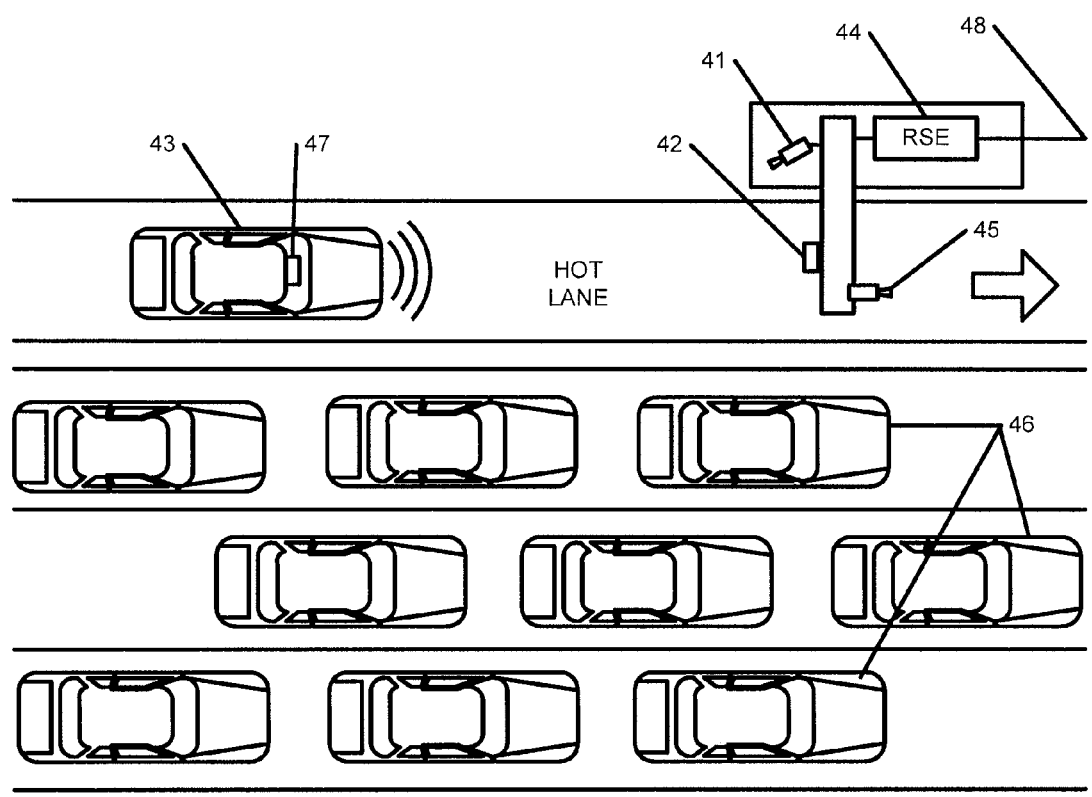
FIG. 3 shows an exemplary verification and enforcement environment, according to some embodiments of the present invention.

FIG. 3 shows an exemplary verification and enforcement environment, according to some embodiments of the present invention, in which vehicle 43 in an HOT lane is passing through a tolling facility, while other vehicles 46 transit non-toll lanes. In some embodiments, the present invention includes road side equipment (RSE) 44 and a transceiver 42 for reading the declared data from the tag 47 corresponding to the vehicle and transferring it via backhaul 48 to a back office. In some embodiments, the tag utilizes communication protocols based on IEEE 802.11p and IEEE 1609 WAVE standards in dedicated zones specially configured for HOT application. Some embodiments may use RF identification technology, CEN DSRC technology or 915 MHz ETC technology. In some embodiments, the data elements captured by the RSE include: tag and account identification, passenger load self-declaration, and history of previous transactions.

As shown in FIG. 3, in addition to the wireless data, cameras 41, 45 may capture vehicle license plate data for verification and enforcement. The captured data elements are transferred to the toll operators' centralized back office for transaction verification, processing and if needed, enforcement. In some embodiments, one or both cameras 41, 45 may also capture the number of passengers in the car, in addition or in alternative to the electronic tag.

Figure 4:
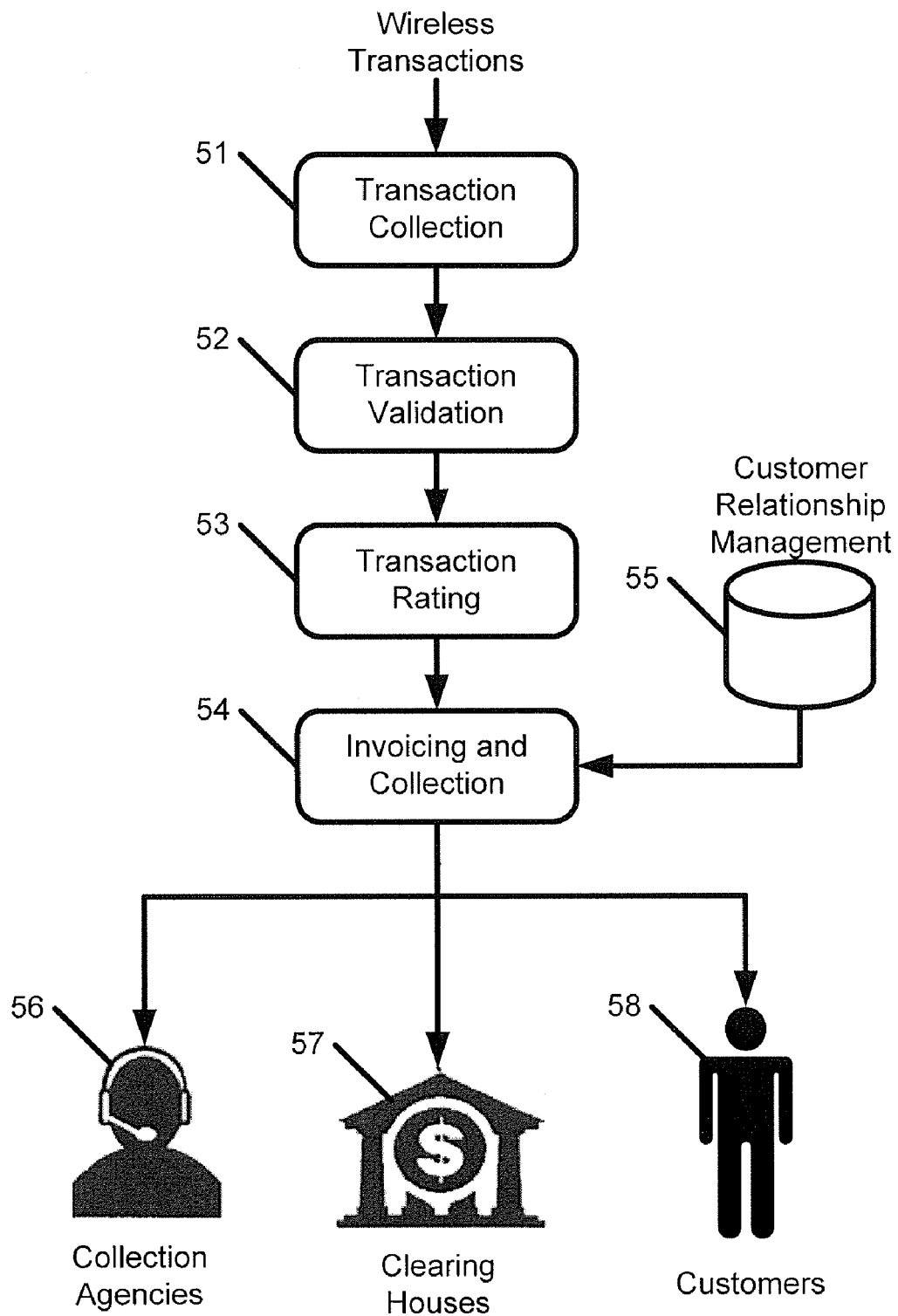
FIG. 4 illustrates an exemplary process flow for utilizing the data captured by the RSE to process the toll transaction, according to some embodiments of the present invention.

FIG. 4 illustrates an exemplary process flow for utilizing the data captured by the RSE to process the toll transaction, according to some embodiments of the present invention. As shown in block 51, transactions captured at each RSE are collected (e.g., by the back office), and validated to ensure completeness and correctness through verification of transaction parameters, in block 52. Rating (assignment of toll pricing), for transactions can be done either by RSE or by the back office, as shown in block 53. For tag-based accounts, the rating may be done by the RSE and the toll may be automatically deducted from the account associated with the tag account. Back office rating can be done in addition to RSE rating for centrally held accounts, allowing complex rating scenarios with multiple tariff configurations; for example corporate and fleet accounts, credit card based accounts, and accounts using electronic funds transfer from a bank account. Customer related data provided by customer relationship management (CRM) 55 may be utilized to for invoicing 54 customers 58. Direct debit and credit card transactions may be sent to clearing houses 57 and unpaid accounts handed over to collection agencies 56.

In some embodiments, transactions for identifiable vehicles are charged directly but external transactions associated with users of another toll operator's electronic tags or unidentifiable vehicles can be managed through an interoperability-enabling transaction clearing platform.

Figure 5:
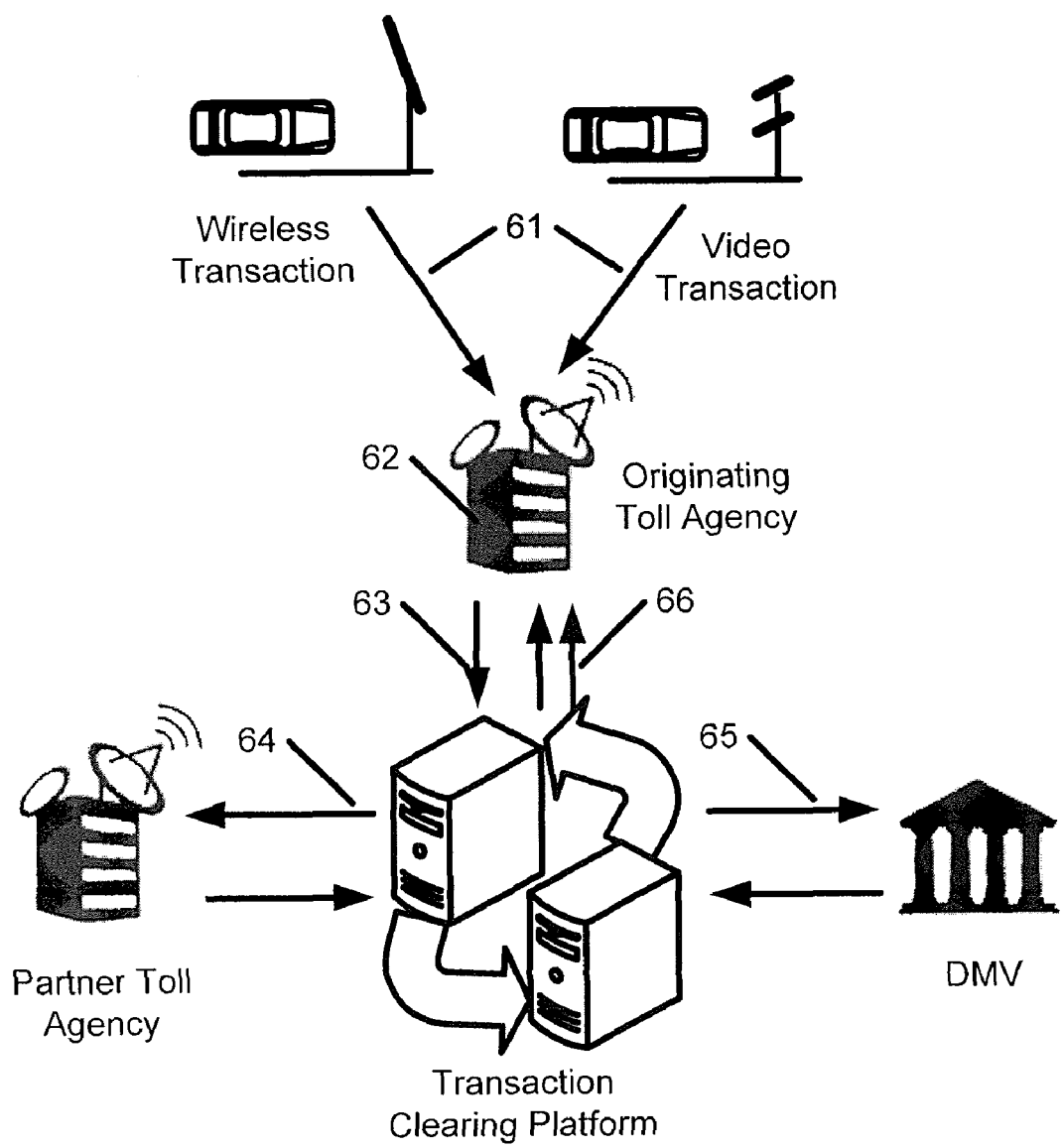
FIG. 5 shows an exemplary transaction clearing platform, according to some embodiments of the present invention.

FIG. 5 shows an exemplary transaction clearing platform, according to some embodiments of the present invention. In some embodiments, the transaction-clearing platform enables migration to improved wireless communication protocols and/or systems, for example, a 5.9 GHz DSRC system, while providing backward compatibility with existing and legacy toll systems. As shown by arrows 61, transaction information is captured and transmitted to the toll agency. If a record of the transaction data or information about the tag owner exists in the database, the transaction is processed 62. If a record of the transaction data does not exist in the database, the received transaction data is forwarded to a transaction-clearing platform (shown by the arrow 63). The clearing platform then validates the transaction against its larger database and upon a match of tag identification with account credentials, the toll transaction is processed with a partner toll agency (for example, an out-of-state toll agency) which remits payment (shown by the arrows 64) to the originating toll agency. If there is no match within toll databases, vehicle information is forwarded to the appropriate Department of Motor Vehicles (DMV) (or other related agencies), which returns vehicle owner information (shown by the arrows 65). The clearing platform then transmits cleared payments and vehicle owner information back to the originating toll agency (shown by the arrows 66).

Figure 6A:
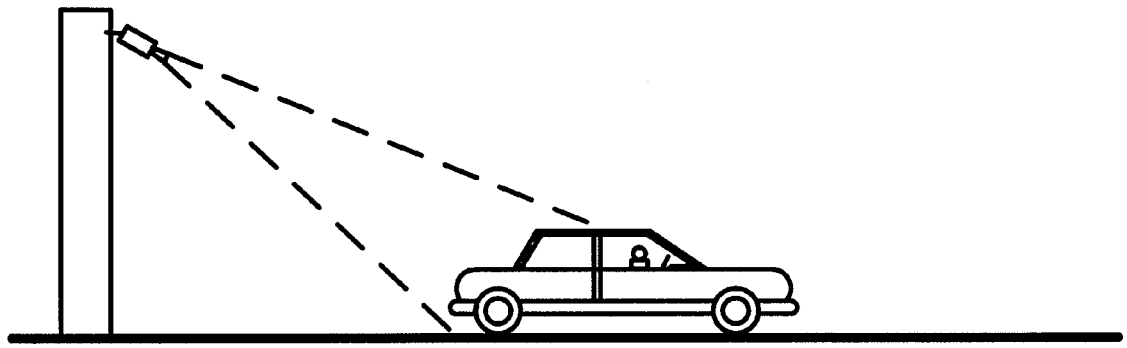
FIGS. 6A and 6B illustrate exemplary enforcement schemes, according to some embodiments of the present invention.
Figure 6B:
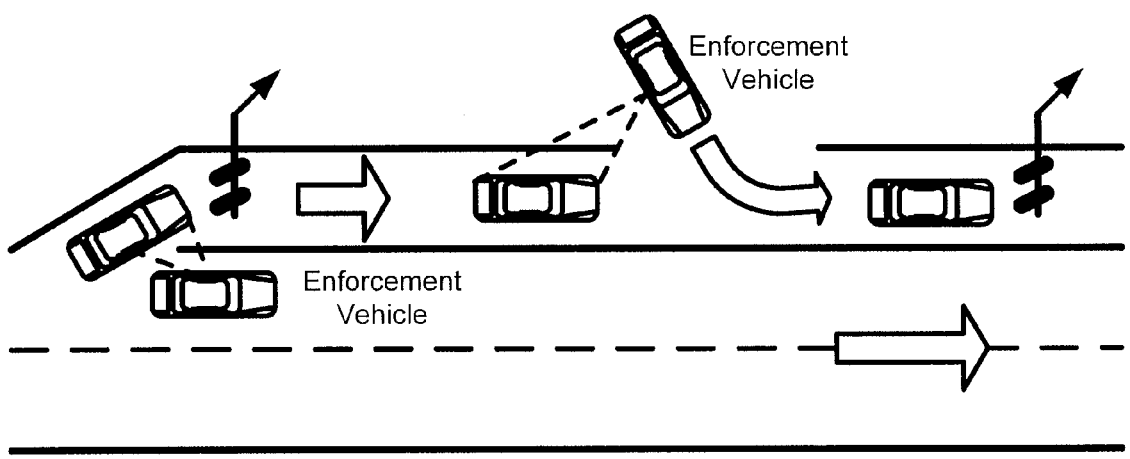

FIGS. 6A and 6B illustrate exemplary enforcement schemes, according to some embodiments of the present invention. In some embodiments, the HOT occupancy and payment rules are protected by a video enforcement scheme, a mobile enforcement scheme, or a combination of both schemes, as shown in FIGS. 6A and 6B. As shown in FIG. 6A, video enforcement may be enabled by self-triggering or manually triggered, digital, high resolution cameras, which capture license plate and/or vehicle occupancy information from vehicles in order to automatically detect of toll violators. The information captured by the RSE enforcement scheme is sent to the back office for processing. The back office can then send alerts/notifications to mobile enforcement vehicles as well as forward evidential information to enforcement agencies for fines processing.

As shown in FIG. 6B, one or more mobile enforcement vehicles equipped with the appropriate wireless equipment (for example, 5.9 GHz DSRC equipment) can read tag data, such as vehicle load and transaction history, and compare it to an enforcement officer's observations to ensure compliance to HOT fee structures. In addition, the back office can identify non-compliant vehicles through reconstructing a vehicle trip based on transactions with the electronic tags and through video enforcement systems, and then forward vehicle information to mobile enforcement units for interception.

In some embodiments, the information captured with the camera is compared with the wirelessly received information. If there are any inconsistencies, the captured information is transmitted to an enforcement vehicle.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the appended claims.

What is claimed is:

1. A method for electronic toll collection from a vehicle, the method comprising:
    electronically receiving a total number of passengers in the vehicle input by a user in a user interface;
    storing the total number of passengers in the vehicle in an electronic tag;
    wirelessly receiving the number of passengers and an electronic tag identification, from the electronic tag, at a toll center;
    determining a toll fee for the vehicle based on the received total number of passengers and a time of day;
    capturing the number of passengers in the vehicle and information about the vehicle by a camera and processing the captured information for enforcement;
    comparing the captured information with the wirelessly received information; and
    transmitting the captured information to an enforcement vehicle when there is an inconsistency between the captured information and the wirelessly received information.

2. The method of claim 1, further comprising electronically receiving traffic information for an area around the toll center and determining the toll fee for the vehicle based on the received number of passengers, the time of day, and said traffic information.

3. The method of claim 2, wherein the traffic information is a number of vehicles in a time period traveling in a high occupancy toll lane, in which said vehicle is traveling.

4. The method of claim 3, wherein the traffic information is determined from a plurality of toll transactions.

5. The method of claim 1, further comprising wirelessly receiving account information for an owner of the electronic tag; and processing the received information for billing the owner.

6. The method of claim 5, further comprising charging a pre-funded account or a credit card for said toll fee.

7. The method of claim 5, further comprising storing toll transaction histories in a database.

8. The method of claim 5, further comprising:
    when the information is received from the electronic tag, checking a database for a record of said owner of the electronic tag; if the record of said owner is not found in the database, forwarding the received information to a clearing platform; validating the received information by the clearing platform; and when validated, processing the toll fee with a partner toll agency, if the record of said owner is not found in the clearing platform, forwarding the received information to an appropriate Department of Motor Vehicles to obtain the record of said owner.

9. A system for electronic toll collection from a vehicle comprising:
    a user interface for accepting input from a user of a total number of passenger in the vehicle;
    an electronic tag for capturing information including said total number of passengers in the vehicle and an electronic tag identification;
    a wireless transmitter for transmitting the captured information;
    a wireless receiver for receiving the captured information; and
    one or more computers for determining a toll fee for the vehicle based on the received total number of passengers and a time of day, for capturing the number of passengers in the vehicle and information about the vehicle by a camera and processing the captured information for enforcement, for comparing the captured information with the wirelessly received information, and for transmitting the captured information to an enforcement vehicle when there is an inconsistency between the captured information and the wirelessly received information.

10. The system of claim 9, wherein the wireless transmitter is an IR or RF transmitter.

11. The system of claim 9, further comprising a plurality of traffic sensors for transmitting traffic information about a high occupancy toll lane, in which said vehicle is traveling, to said one or more computers, wherein said one or more computers determine the toll fee for the vehicle based on the received number of passengers, the time of day, and said traffic information.

12. The system of claim 11, wherein said one or more computers determine the toll fee for the vehicle based on day.

13. The system of claim 9, further comprising a first database for storing account information for an owner of the electronic tag; and a back office computer for processing the received information for charging the owner.

14. The system of claim 13, wherein the back office computer is capable of charging a pre-funded account or a credit card for said toll fee.

15. The system of claim 9, further comprising a digital camera for capturing the number of passengers in the vehicle and information about the vehicle and transmitting the captured information to an enforcement vehicle for enforcement, or to an enforcement agency for fines processing.

16. The system of claim 13, wherein said back office computer is configured to check the first database for a record of said owner of the electronic tag, when the information is received from the electronic tag, and if the record of said owner is not found in the database, to forward the received information to a clearing platform; the clearing platform being configured to validate the received information using a second database, and if validated, to process the toll fee with a partner toll agency.

* * * * *